United States Patent [19]

Lachmann

[11] Patent Number: 4,673,162

[45] Date of Patent: Jun. 16, 1987

[54] HIGH-PRESSURE SELF-ACTUATING FLOW-CONTROL VALVE ASSEMBLY

[76] Inventor: Helmut Lachmann, Margrefstr. 40, 43 Essen 16, Fed. Rep. of Germany

[21] Appl. No.: 817,161

[22] Filed: Jan. 8, 1986

Related U.S. Application Data

[63] Continuation of Ser. No. 536,892, Sep. 28, 1983, abandoned.

[30] Foreign Application Priority Data

Sep. 28, 1982 [DE] Fed. Rep. of Germany ....... 3235778
Dec. 17, 1982 [DE] Fed. Rep. of Germany ....... 3246738

[51] Int. Cl.⁴ ............................................ F16K 31/12
[52] U.S. Cl. .............................. 251/30.01; 251/30.02; 251/30.05; 251/63.5; 91/417 R; 137/614.11
[58] Field of Search ..................... 251/30, 31, 63, 63.5, 251/324, 30.01, 30.02, 30.05; 137/487.5, 485, 330, 614.11; 91/417, 429, 430

[56] References Cited

U.S. PATENT DOCUMENTS

| | | | |
|---|---|---|---|
| 320,293 | 6/1885 | Saunders | 91/417 R |
| 358,775 | 3/1887 | Graves | 91/417 R |
| 2,797,666 | 6/1957 | Chubbuck | 91/429 X |
| 3,094,132 | 6/1963 | Byloff | 137/330 X |
| 3,295,488 | 1/1967 | Hinsch et al. | 91/429 X |
| 3,406,703 | 10/1968 | Gordon | 91/429 X |
| 3,462,115 | 8/1969 | Barker | 91/429 X |
| 3,466,003 | 9/1969 | Boonshaft et al. | 91/429 X |
| 3,470,892 | 10/1969 | Barker | 251/30 X |
| 3,709,253 | 1/1973 | Spangenberg | 91/429 X |
| 3,811,279 | 5/1974 | Vogeli | 251/63.5 X |
| 3,874,407 | 4/1975 | Griswold | 251/129 X |
| 3,911,955 | 10/1975 | Link | 251/30.02 X |
| 3,980,002 | 9/1976 | Jarman et al. | 251/30 X |
| 3,981,478 | 9/1976 | Lundsgart | 251/30 X |
| 4,167,262 | 9/1979 | Lemmon | 251/63 X |
| 4,281,584 | 8/1981 | Onken et al. | 91/417 R X |
| 4,481,768 | 11/1984 | Goshorn et al. | 91/429 X |

FOREIGN PATENT DOCUMENTS

| | | | |
|---|---|---|---|
| 54619 | 6/1982 | European Pat. Off. | 91/417 R |
| 2201228 | 7/1973 | Fed. Rep. of Germany | 251/63.5 |
| 2816951 | 10/1979 | Fed. Rep. of Germany | 137/614.11 |
| 20611 | 10/1968 | Japan | 251/30.02 |
| 691383 | 5/1953 | United Kingdom | 91/429 |
| 951731 | 3/1964 | United Kingdom | 137/614.11 |

Primary Examiner—James C. Yeung

[57] ABSTRACT

A flow-control valve assembly comprises a housing formed with a valve chamber, an inlet port and an outlet port both opening into the valve chamber, a valve seat at one of the ports, and a control chamber. A valve body is displaceable in the valve chamber between a closed end position engaging the seat and blocking flow between the ports and an open end position clear of the seat and permitting flow between the ports through the chamber. This valve body has a valve face exposed to the pressure at the inlet seat in the closed position. A control body in the control chamber has a control face and an oppositely directed counterpressure face. This control body subdivides the control chamber into a control compartment at the control face and a counterpressure compartment at the counterpressure face. The counterpressure face is of greater effective surface area than the valve face. A link interconnects the control and valve bodies for joint movement for increasing the volume of one of the compartments while decreasing that of the other compartment as the valve body moves from the open to the closed position and for decreasing the volume of the other compartment while increasing that of the one compartment as the valve body moves from the closed to the open position.

4 Claims, 4 Drawing Figures

4,673,162

HIGH-PRESSURE SELF-ACTUATING FLOW-CONTROL VALVE ASSEMBLY

This is a continuation of co-pending application Ser. No. 536,892 filed on Sept. 28, 1983, now abandoned.

FIELD OF THE INVENTION

The present invention relates to a self-actuating flow-control valve assembly. More particularly this invention concerns such a valve assembly usable to control high-pressure water.

BACKGROUND OF THE INVENTION

A flow-control valve assembly is known that has a housing formed with a valve chamber, an inlet port and an outlet port both opening into the valve chamber, and a valve seat at one of the ports. A valve body is displaceable in the valve chamber between a closed end position engaging the seat and blocking flow between the ports and an open end position clear of the seat and permitting flow between the ports through the chamber. The valve body is actuated by a control body in a control chamber and having a pair of oppositely directed faces. This control body subdivides the control chamber into a pair of compartments at the respective faces. A link interconnects the control and valve bodies for joint movement to increase the volume of one of the compartments while decreasing that of the other compartment as the valve body moves from the open to the closed position and to decrease the volume of the other compartment while increasing that of the one compartment as the valve body moves from the closed to the open position.

A sump at substantially lower pressure than the inlet port can be connected by appropriate control valves to either compartment, and the other compartment can be connected through a conduit to the inlet port. Thus one of the compartments of the control unit can be depressurized and the other pressurized to move the valve body in the appropriate direction.

Such a valve assembly, as described in German Pat. No. 3,131,860, is typically used in hydraulic systems and can work at pressures in the 300 bar range. Normally it is set up as nothing more complex than a shutoff valve, as accurate control of the flow section of the passage it forms is quite difficult.

The main difficulty with such arrangements is that the considerable pressure differential across the control body is extremely difficult to seal adequately. Leakage across the control body allows the valve body to move somewhat, thereby making the valve fairly useless. In addition such devices are not employed in water lines and the like where any grit or other impurities might be present in the liquid whose flow is being controlled and which is being used to actuate the valve.

It is known to use the pressure of the fluid being controlled to close the valve, while using an externally generated force to open it. Such a valve is a pure on/off or shutoff valve in which the flow cross section while open can be set by an external screw-type mechanism. While in use one compartment is always pressurized at the inlet pressure, so that when the valve is closed there is once again a very large pressure differential at this location, leading to leakage. The external force can even be a simple electromagnetically generated one, allowing accurate adjustment of the valve, while working very slowly in view of the high pressure it is working against A further system is known from German Pat. No. 2,750,510 which works as a proportional valve that can be adjusted dynamically. The control body in this arrangement is braced against a spring, so that once again there is a considerable pressure differential between its pressurized and its nonpressurized side.

OBJECTS OF THE INVENTION

It is therefore an object of the present invention to provide an improved self-actuating flow-control valve assembly.

Another object is the provision of such a valve assembly which does not have the above-described pressure differential across its control body, and which can handle very high pressures.

A further object is to provide such a valve which can be used conveniently to control high-pressure water that may not be perfectly clean.

SUMMARY OF THE INVENTION

A flow-control valve assembly according to this invention comprises a housing formed with a valve chamber, an inlet port and an outlet port both opening into the valve chamber, a valve seat at one of the ports, and a control chamber. A valve body is displaceable in the valve chamber between a closed end position engaging the seat and blocking flow between the ports and an open end position clear of the seat and permitting flow between the ports through the chamber. This valve body has a valve face exposed to the pressure at the inlet seat in the closed position. A control body in the control chamber has a control face and an oppositely directed counterpressure face. This control body subdivides the control chamber into a control compartment at the control face and a counterpressure compartment at the counterpressure face. The counterpressure face is of greater effective surface area than the valve face. A link interconnects the control and valve bodies for joint movement for increasing the volume of one of the compartments while decreasing that of the other compartment as the valve body moves from the open to the closed position and for decreasing the volume of the other compartment while increasing that of the one compartment as the valve body moves from the closed to the open position. A sump at substantially lower pressure than the inlet port and a conduit connected between the inlet port and the control compartment can be connected by an appropriate control unit to the compartments to isolate the counterpressure compartment from the sump and from the control compartment, to shift the valve body in one direction between its end positions by applying equal pressure to both compartments, and to depressurize the counterpressure compartment and oppositely shift the valve body. Thus the term "control" here is purely functional, indicating that compartment in which the input pressure is normally applied, while the term "counterpressure" relates to that compartment which is opposed to the force in the control compartment, and that either is also connected to the input port, so it is at the same pressure as the control compartment, or that is completely cut off, so the fluid trapped in it will be at the pressure of the control compartment, except of course during an adjustment when the counterpressure compartment is briefly connected to the sump to allow it to drain. Obviously to move the control body the effective surface area of the faces directed in the closing direction must be greater than the surface area of the oppositely directed face.

The system of this invention therefore employs the incompressibility of the liquid being controlled by the valve assembly of this invention to minimize the pressure differential across the control body. Except during adjustment, the fluid in the counterpressure compartment is trapped so that the volume of this compartment is also fixed. This in turn solidly arrests the control and valve bodies. Draining some of this fluid out of the counterpressure compartment allows the valve-body position to be extremely accurately controlled. Conversely, pressurizing it and thereby shifting the control body to increase the size of the backflow compartment allows opposite displacement of the valve body, it being possible to direct the forces either way, with the counterpressure compartment lying between the control compartment and the valve body, or with the control compartment between the backflow compartment and the valve body. In any case even during adjustment the pressure differential across the control body will be negligible. Since the incompressible fluid in the counterpressure compartment is what arrests the valve body, variations in pressure at the input port have no effect on the setting selected, they will merely vary the static pressure in the compartments.

The control face according to this invention has an effective surface area greater than the difference between that of the counterpressure face and that of the valve face. In addition the conduit connects the control compartment directly with the inlet port, that is not through a valve.

For accurate flow control the valve body is of waisted multisection construction and the valve seat is complementarily shaped to form a succession of variable restrictions. These restrictions are of decreasing flow cross section from the input port to the output port. Thus flow is smoothly throttled while avoiding high stress at any one location.

The control unit according to this invention comprises a control valve having two sides, one of which is connected to the control compartment and the other of which is connected to the counterpressure compartment, and a drain valve having two sides, one of which is connected with the other side of the control valve to the counterpressure compartment and the other of which is connected to the sump. This control means or unit is effective in a first holding position for closing both the control and drain valves and thereby isolating the counterpressure compartment from the sump and from the control compartment. In a second position it opens the control valve and closes the drain valve to shift the valve body in one direction between its end positions by application of equal pressure in both compartments. In a third position it closes the control valve and opens the drain valve to depressurize the counterpressure compartment and opposite shift the valve body.

According to this invention the control compartment lies between the counterpressure compartment and the valve body.

The control and drain valves can be of the variable-restriction type. They are normally of the solenoid type and the control unit includes means for generating pulsating direct-current voltage and feeding same to the control and drain valves. Thus the valve body will not stick, so no particularly great force is needed to move it initially.

According to this invention the effective surface area of the control face can be smaller than the difference between the effective surface areas of the counterpressure face and the valve face. Thus the effective surface area of the counterpressure face is greater than the sum of the effective surface areas of the valve and control faces.

It is also within the scope of this invention for the effective surface area of the counterpressure face to be smaller than the difference between the effective surface areas of the control face and the valve face. Thus the effective surface area of the control face is greater than the sum of the effective surface areas of the valve and counterpressure faces.

DESCRIPTION OF THE DRAWING

The above and other features and advantages will become more readily apparent from the following, reference being made to the accompanying drawing in which.

SPECIFIC DESCRIPTION

Figure 1:
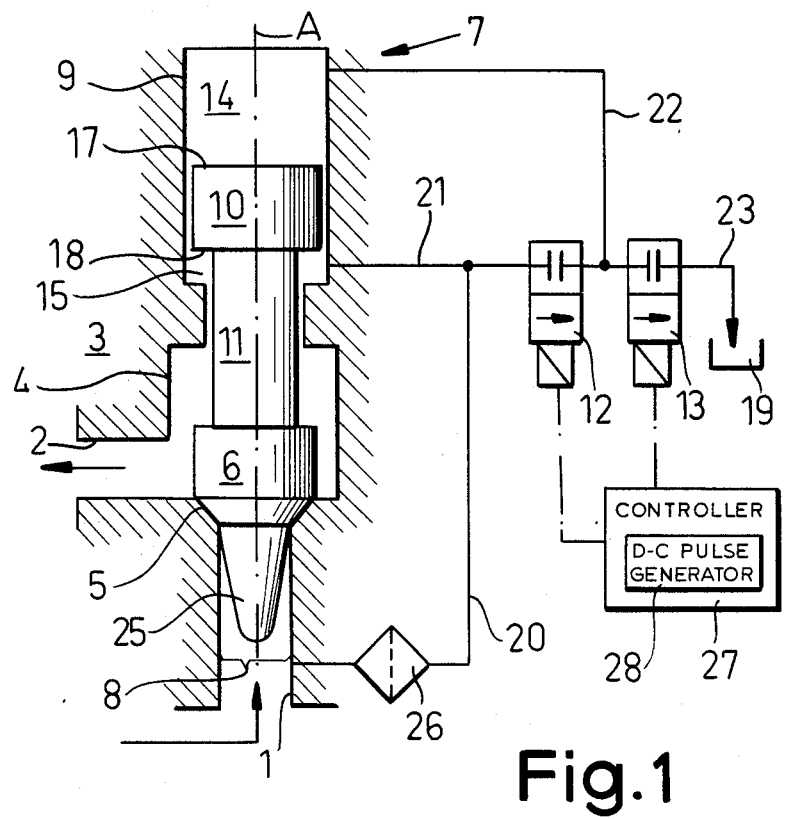
FIG. 1 is a mainly schematic view of a valve assembly according to this invention.
Figure 2:
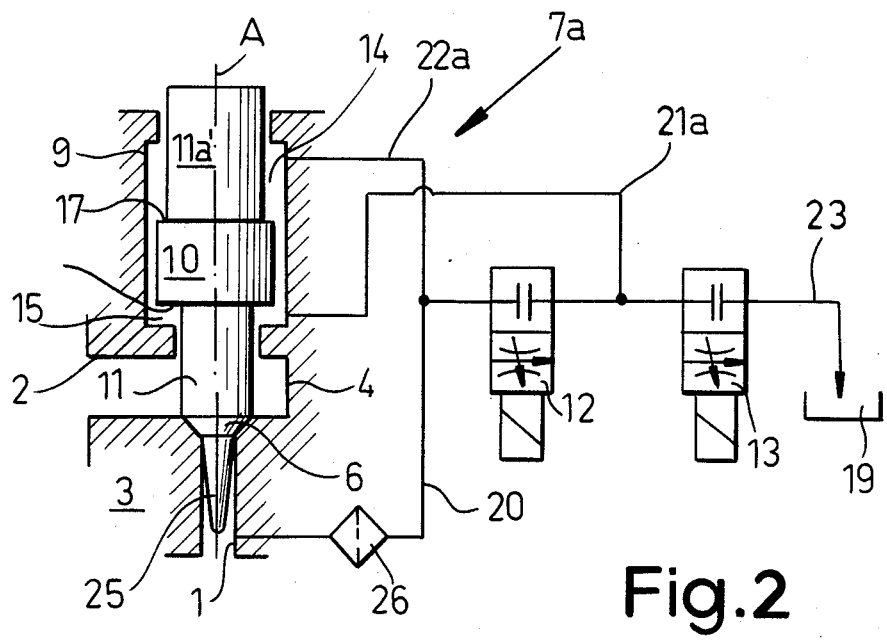
FIG. 2 is a view like FIG. 1 of another valve assembly in accordance with this invention.

As seen in FIGS. 1 and 2 respective valves 7 and 7a according to this invention are very similar. They each have a housing 3 formed with an inlet port 1 and an outlet port 2 both opening into a cylindrical valve chamber 4 centered on an axis A and formed around the port 1 with an axially centered frustoconical valve seat 5. A valve body 6 can move axially in the housing 3 between a lower closed position engaged snugly with the seat 5 and blocking fluid flow between the inlet port 1 and outlet port 2, and an unillustrated upper position clear of the seat 5 and permitting such fluid flow. In the closed position the valve body 6 exposes in the port a surface indicated at 8 and actually formed by a blunt-conical extension 25 that serves to deflect flow and prevent grit and the like from building up in the unit.

A link rod 11 also centered on the axis A extends back from the valve body 6 to a cylindrical chamber 9 coaxial with the body 6. Within this chamber 9 it is formed with a cylindrical control body 10 that fits snugly into the chamber 9 and that has a rear face 17 turned axially away from the valve seat 5 and a front face 18 turned axially toward the seat 5. This body 10 subdivides the chamber 9 into a rear compartment 14 at the rear face 17 and a front compartment 15 at the front face 18. The face 17 is of substantially greater effective surface area than the face 8 of the valve body 6, and the front face 18 is larger than the difference between the face 8 and the face 17. Thus the total effective area of the faces 8 and 18 is greater than that of the face 17.

As further seen in both FIGS. 1 and 2, the housing 3 is formed or associated with a conduit 20 extending from the inlet port 1 downstream of the seat 5 to one side of a control valve 12 of the two-position slide type and including a filter or accumulator 26. A drain valve 13 substantially identical to the valve 12 has one side connected to the other side of the valve 12 and another side connected via a line 23 to a low-pressure sump 19. These valves 12 and 13 are of the solenoid type that automatically closes when not electrically energized, and that allows at least restricted flow when opened. They are both operated by a controller 27 including a generator 28 of pulsed direct-current voltage, either discrete d-c pulses or direct current modulated with a smaller alternating current. Such pulsating energization of the valves 12 and 13 prevents them from freezing, so when they have to make a gross movement they need not overcome static friction, only sliding friction. The controller 27 can open the two valves 12 and 13 independently of each other.

If the valve 12 is made to be of the type that opens when deenergized, the respective valve 7 or 7a will automatically close, in the manner described below, in a power outage. This can represent an important safety feature and is one of the particularly useful advantages of using a self-actuating valve.

The valves 7 and 7a of FIGS. 1 and 2 have faces 8, 17, and 18 of different effective surface areas, and are connected differently to the valves 12 and 13. The valve 7 of FIG. 1 has its front compartment 15 connected via a conduit or line 21 with the conduit 20 and to the one side of the valve 12, and its rear compartment 14 is connected via a line or passage 22 to the other side of the control valve 12 and to the one side of the drain valve 13. In addition in FIG. 1 the face 18 is smaller than the difference between the face 17 and the face 8. The rear compartment 14 therefore constitutes a counterpressure compartment and the front compartment 15 a control compartment.

When the valves 12 and 13 are both closed as shown in FIG. 1, the valve 7 is in the holding position. The full pressure of the inlet port 1 is applied through the lines 20 and 21 to the faces 8 and 18, but since the counterpressure compartment is blocked off by the valve 13 from the sump 19, fluid cannot flow out of it and the incompressible fluid in it completely prevents the valve body 6 from lifting up off the seat 5.

To open the valve 7, the drain valve 13 is energized to allow fluid to flow out of the counterpressure compartment 14. Once the valve body 6 is lifted the desired extent off the seat 5 the valve 13 can be closed again to leave the valve 7 set in the desired position. This allows the valve 7 to be set extremely accurately in any position between fully open and fully closed.

To close the valve 7 or to move it toward the closed position, the valve 12 is opened while the valve 13 is closed. Since in this arrangement the effective surface area of the face 17 is greater than the sum of the surface areas of the faces 8 and 18, the resultant equal pressure in both compartments 14 and 15 will shift the bodies 10 and 6 down. Once again, closing of the valve 12 at any time again freezes the valve 7.

In the valve 7a of FIG. 2 the front compartment 15 is connected via a conduit or line 21a to the other side of the control valve 12 and to the one side of the drain valve 13, and its rear compartment 14 is connected via a line or passage 22a with the conduit 20 and to the one side of the valve 12. In addition in FIG. 2 the effective surface area of the face 18 is greater than the difference between those of the face 17 and of the face 8, as the body 10 carries a rearward extension 11a' that pokes axially out of the back of the housing 3. The front compartment 15 therefore constitutes a counterpressure compartment and the rear compartment 14 a control compartment. In addition in this arrangement the valves 12 and 13 are of the adjustable-throttle type when open.

When the valves 12 and 13 are both closed as shown in FIG. 1, the valve 7 is in the holding position, exactly as in the valve 7 of FIG. 1.

To open the valve 7a, the drain valve 12 is energized to allow fluid to flow out of the counterpressure compartment 15 while the valve 13 is maintained closed.

To close the valve 7a, the valve 13 is opened while the valve 12 is closed. Since in this arrangement the effective surface area of the face 18 is greater than the difference between the surface areas of the faces 8 and 17, that is the surface areas of the faces 18 and 8 together are greater than that of the face 17, the resultant equal pressure in both compartments 14 and 15 will shift the bodies 10 and 6 down. Once again, closing of the valve 12 at any time again freezes the valve 7a.

Figure 3:
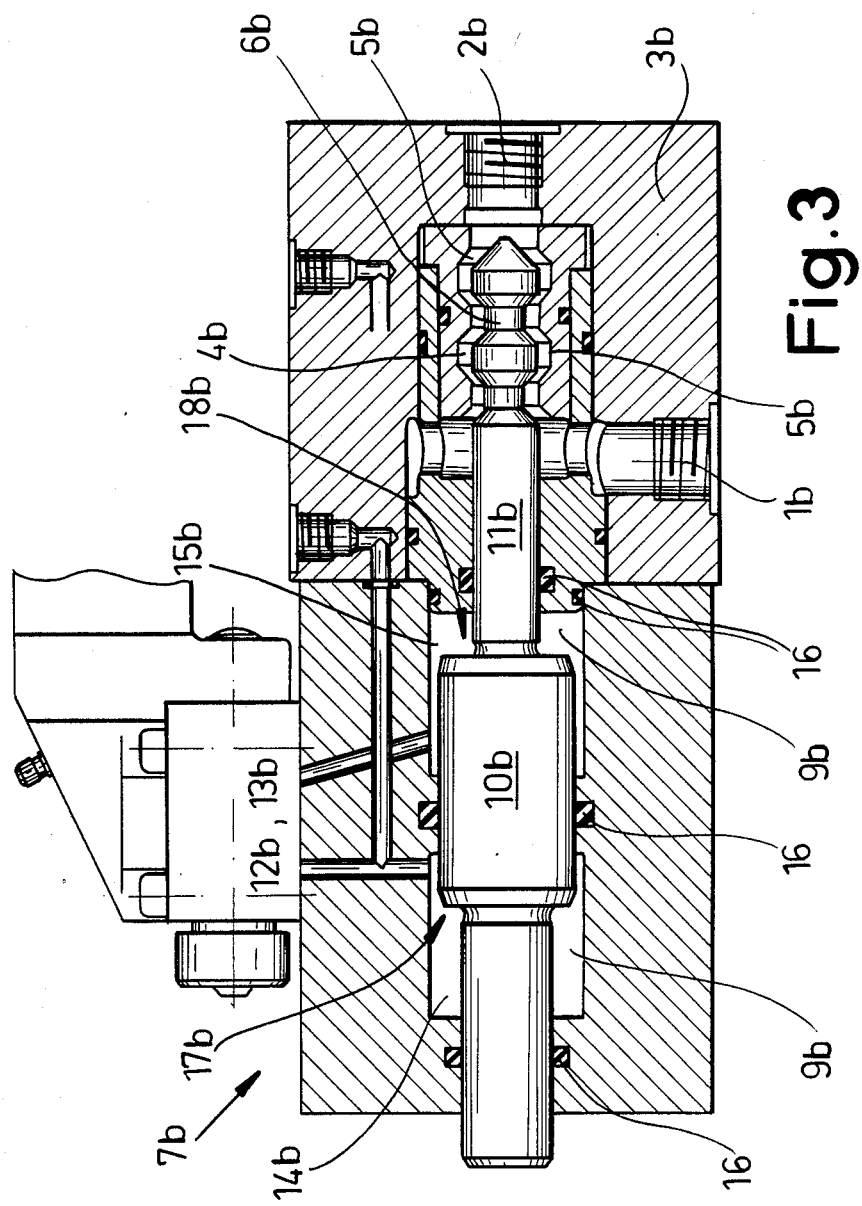
FIGS. 3 and 4 are axial sections through parts of two further valve assemblies of the instant invention.

In the arrangement of FIG. 3 the structure of a valve 7b according to this invention is shown in some detail, with all parts that are functionally identical to those of the other valves 7 and 7a being identified with the same reference numerals but bearing a postscript b. The seals that prevent leakage from the housing 3b are shown at 16. This valve 7b operates in the manner described with reference to FIG. 2. In this arrangement the valve body 6b is alternately thick and thin, and the valve seat 5b is complementarily shaped, but of decreasing size in the flow direction. Thus this valve 7b forms a multiple restriction that can be very carefully controlled.

Figure 4:
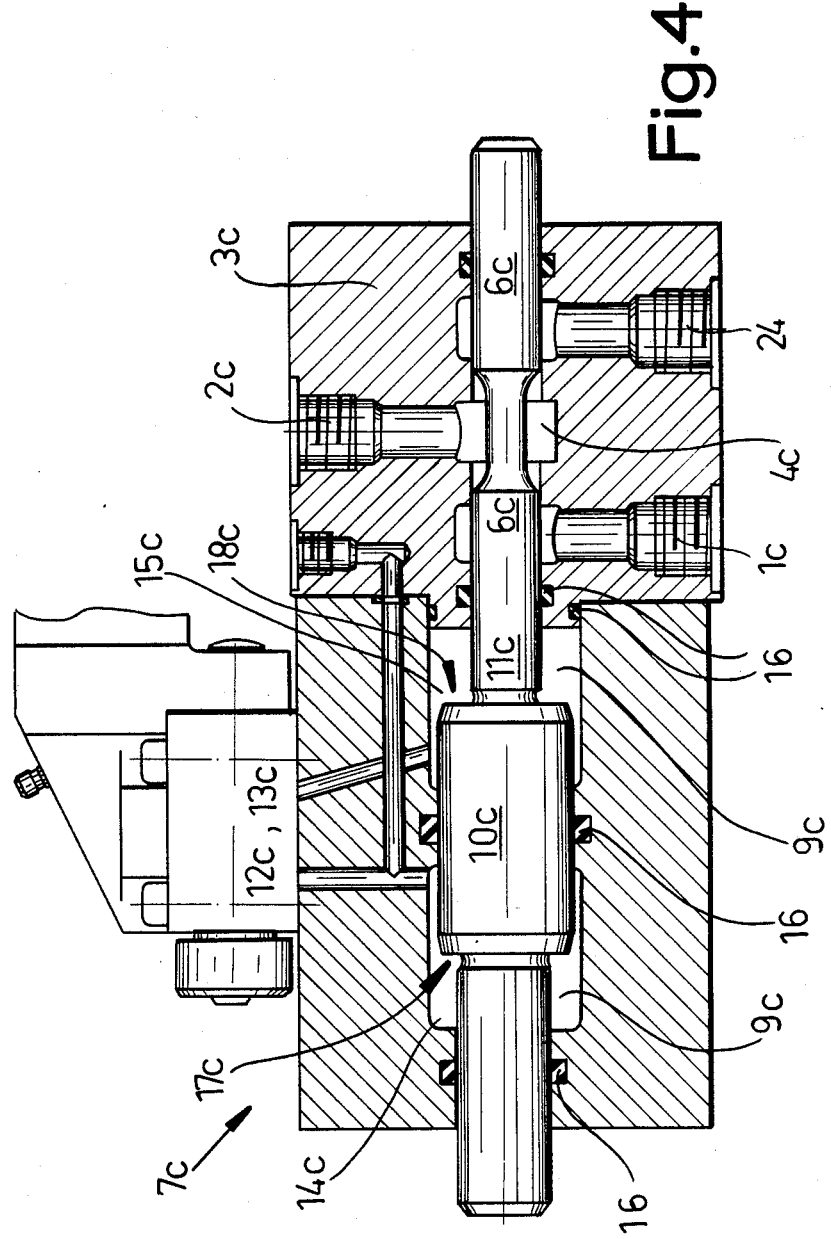

In FIG. 4 a valve 7c is shown having a waisted spool-valve structure for the valve body 6, and provided with a separate return line or connection 24. This valve 7c also is connected up like the valve 7a of FIG. 2.

The system of this invention is ideal for controlling flow in a high-pressure water line, using the water pressure itself to energize the valve. Since there will only be a pressure differential across the control body 10 when the valve is being operated, leakage here is minimal. Thus very high pressures can be controlled relatively easily.

I claim:
1. A valve assembly for controlling the flow of water, the assembly comprising:
  a housing formed with
    a valve chamber and a separate control chamber,
    an inlet port and an outlet port both opening into the valve chamber, the inlet port normally being pressurized at high pressure by the water whose flow is being controlled by the assembly, and
    a valve seat at the inlet port;
  a valve body in the valve chamber displaceable between a closed end position engaging the seat and blocking flow of the water between the ports and an open end position clear of the seat and permitting flow between the ports through the valve chamber, the valve body having a downwardly tapered end projecting downward at least partially into the inlet port, the valve body defining in intermediate positions between the closed position and the open position the flow cross section of upward flow of water through the inlet port, the valve body having a valve face exposed downward to the pressure of the flow of water;
  a control body in the control chamber, the control body formed with a control face and a counterpressure face directed away from the control face, one of the faces being directed away from the control face, one face being of greater effective surface area than the valve face, the control body subdividing the control chamber into a control compart- ment at the control face and a counterpressure compartment at the counterpressure face, one of the compartments being between the other of the compartments and the valve chamber;

link means interconnecting the control and valve bodies for joint movement for increasing the volume of the one compartment while decreasing that of the other compartment as the valve body moves from the open to the closed position and for decreasing the volume of the one compartment while increasing that of the other compartment as the valve body moves from the closed to the open position;

a sump at substantially lower pressure than the inlet port;

a control flow line connecting the control and counterpressure compartments;

a counterpressure flow line connecting the counterpressure compartment and the sump;

a solenoid-type control valve in the control flow line and openable to permit flow through the respective flow line and closable to block flow through the control flow line;

a solenoid-type drain valve in the counterpressure flow line and openable to permit flow through the respective flow line and closable to block flow through the counterpressure flow line;

conduit means extending from the inlet port to the control compartment for continuously pressurizing the control compartment with the pressure of the inlet port; and control means including means for generating pulsating direct-current voltage and feeding the pulsating voltage to the control and drain valves for, in a first valve-body holding position, closing both the control and drain valves and thereby isolating the counterpressure compartment from the sump and from the control compartment for trapping water in the counterpressure compartment and substantially preventing the valve and control bodies from moving, in a second position, opening the control valve and closing the drain valve for shifting the valve body in one direction between the open and closed positions by application of equal pressure through the flow lines to both compartments, and in a third position, closing the control valve and opening the drain valve for depressurizing the counterpressure compartment while pressurizing the control compartment to oppositely shift the valve body.

2. The flow-control valve assembly defined in claim 1 wherein the control and drain valves are of the variable-restriction type.

3. The flow-control valve assembly defined in claim 1 wherein the control compartment is between the counterpressure compartment and the valve chamber and the effective surface area of the control face is smaller than the difference between the effective surface areas of the counterpressure face and the valve face, whereby the effective surface area of the counterpressure face is greater than the sum of the effective surface areas of the valve and control faces.

4. The flow-control valve assembly defined in claim 1 wherein the counter pressure compartment lies between the control compartment and the valve chamber and the effective surface area of the counterpressure face is greater than the difference between the effective surface areas of the control face and the valve face, whereby the effective surface area of the control face is smaller than the sum of the effective surface areas of the valve and counterpressure faces.

* * * * *